(No Model.)
H. B. BROWN.
BICYCLE BRAKE.
No. 577,396. Patented Feb. 16, 1897.
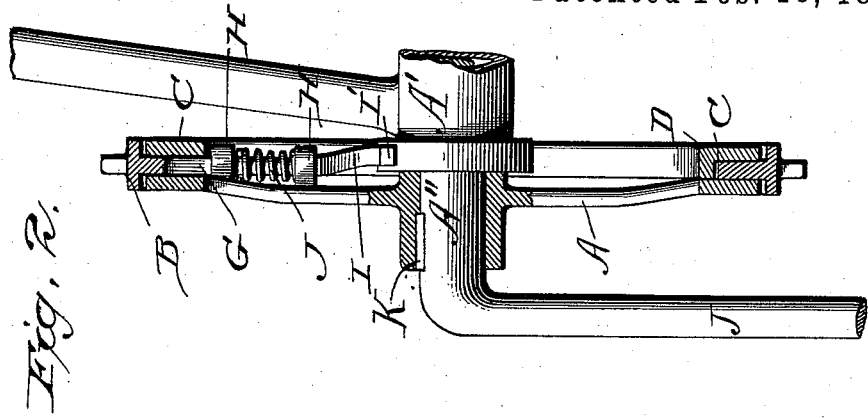
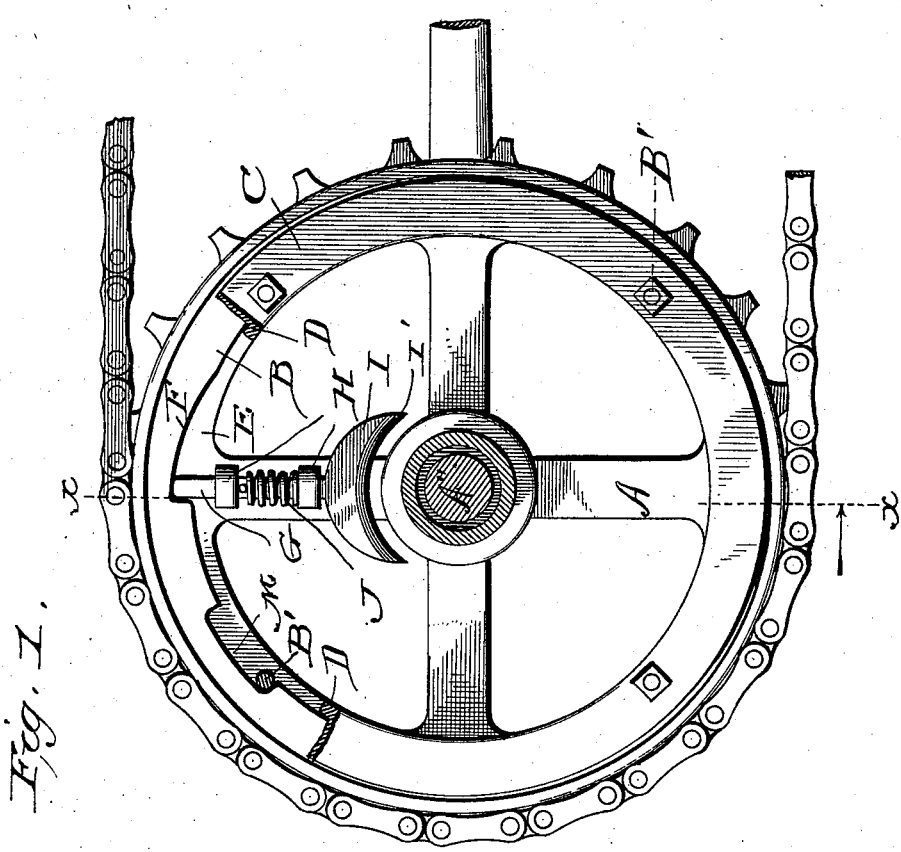
Witnesses
Inventor:
Harrison B. Brown
per Rhu G. DuBois
Attorney

UNITED STATES PATENT OFFICE.

HARRISON B. BROWN, OF CHEVY CHASE, MARYLAND.

BICYCLE-BRAKE.

SPECIFICATION forming part of Letters Patent No. 577,396, dated February 16, 1897.

Application filed July 11, 1896. Serial No. 598,784. (No model.)

*To all whom it may concern:*

Be it known that I, HARRISON B. BROWN, a citizen of the United States, residing at Chevy Chase, in the county of Montgomery and State of Maryland, have invented certain new and useful Improvements in Bicycle-Brakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain improvements in bicycle-brakes; and the invention consists, briefly, in a special brake mechanism automatic in action and made to act by a reverse motion of the cranks, as hereinafter fully described, and pointed out in the claims.

In the accompanying drawings, which illustrate my invention, I have shown only such parts of a bicycle as will define the application and show how the brake is made to act, and in which—

Figure 1 is a view showing in side elevation the forward sprocket-wheel partly in section. The crank-axle and its bearing are in section, taken on a line just inside the sprocket-wheel. Fig. 2 is a transverse section on line $x\,x$ of Fig. 1, showing a part of the crank-axle support and the contact of the brake-shoe with the said axle-support.

In the views, A denotes a sprocket-wheel of any approved form, save that the rim is provided with a relatively movable toothed member B, held in place by a circular felly-plate C, secured to the wheel in any desired manner, but preferably by bolts B'. The securing-plate C between its points of attachment is bent at right angles, as at D, forming a seat for the member B. The inner periphery of the toothed member B is provided with a cut-out portion E, forming a cam-surface F, which has contact with the upper end of a radially-extending arm G, supported by keepers or bearings H, rigid with the sprocket. In lieu of the foregoing any desired means for supporting this arm may be resorted to so long as the necessary movement and security are provided to insure proper action of the cam F on its upper end. The lower end of the arm G carries a shoe I, which has contact with the crank-hanger A', through which the crank-axle A" passes. It is of course understood that where the shoe I comes in contact with the frame or part carrying the crank-axle it may be provided with a wearing-plate I'.

In cases where braces or other parts of the frame join the crank-axle support close to its ends the sprocket can be moved to allow a space for the wearing-plate.

As shown in Fig. 1 of the drawings, the chain rests on the movable member B of the wheel. Now when the crank is turned forward the upper end of the arm G projects up into the deepest part of the cam F, and is so held by a coil-spring J, encircling the brake-arm and having its upper end secured to the arm G and its lower end resting on the lower keeper H.

J represents the crank, and K the feather-key which secures the sprocket-wheel on the axle.

B' is a stop-pin to limit the longitudinal movement of the toothed ring B.

From the foregoing it will be understood that upon a reversal of the motion of the cranks, the sprocket being loose on the felly-plate C of the wheel A, it will be retarded, while the movable member B will continue in a forward motion with the chain by reason of the momentum of the machine, thus causing the member B to slip and bring the incline or cam F in contact with the upper end of the arm G and shove it down in a radial direction against the tension of the spring J until the shoe I rests on the wearing-plate. The wearing-plate being immovable sufficient friction will be had to retard the forward motion of the sprocket-wheel, and thus, through the chain, check the rear or driving wheel. The member B should have such motion only as to permit the cam F to properly act; but as such limitation of the movement of said member B can be accomplished in so many ways I do not desire to confine myself to any special means. Cutting the member, as at M, to receive the bolts B', securing the plate C, is one way. It may be found, however, that the arm G will provide the necessary limitation to the movement of the said member B. It is evident that the said member must have a movement, and the construction admitting thereof should be optional with the manufacturers.

With my improved brake, in riding down-grade, should the speed increase to an undesirable degree, the simple act of back-pedaling will set the brake, not to stop the wheel, but in a measure brake the sprocket to the frame sufficiently to assist the rider in checking the momentum of the wheel.

Having thus fully described my invention, what I claim as new, and desire to secure by Letters Patent, is—

1. In a bicycle, a brake device consisting of the combination with a driving-wheel, its axle and crank-hanger, of a circumferential toothed ring movable longitudinally on the wheel, a cam on said ring, a radially-movable arm also carried on the wheel, a shoe on the arm, an immovable friction-surface on the hanger, devices for limiting the movement of said ring, and a spring for normally holding the shoe out of contact with said surface, substantially as described.

2. In a bicycle, a brake device consisting of the combination with a sprocket-wheel, its axle, crank-hanger and chain, of a circumferentially-movable toothed ring on the wheel, a radially-movable brake on an arm operating in guides on the wheel and provided with a retracting-spring encircling the brake-arm, means in connection with the ring for applying the brake, devices for limiting the movement of the ring, and a friction-surface on the hanger, substantially as described.

3. In combination with the drive-wheel, its axle and crank-hanger, a brake device consisting of a circumferentially-movable toothed member on the drive-wheel, a cam on said member, a movable brake-arm against which the cam operates, a shoe on the inner end of the arm, a brake-surface on the crank-hanger and a spring adapted to hold the shoe out of contact with the hanger, substantially as described.

In witness whereof I affix my signature in presence of two witnesses.

HARRISON B. BROWN.

Witnesses:
BENJAMIN F. SNYDER,
SOLON C. KEMON.